United States Patent [19]
Okazaki et al.

[11] Patent Number: 5,194,559
[45] Date of Patent: Mar. 16, 1993

[54] OPTICAL URETHANE RESINS AND PLASTIC LENSES COMPRISING THE SAME

[75] Inventors: Koju Okazaki; Masahiko Kusumoto; Hiroyuki Yamashita; Teruyuki Nagata, all of Fukuoka, Japan

[73] Assignee: Mitsui Toatsu Chemicals, Inc., Tokyo, Japan

[21] Appl. No.: 854,583

[22] Filed: Mar. 20, 1992

[30] Foreign Application Priority Data

Mar. 25, 1991 [JP] Japan ................................ 3-60080

[51] Int. Cl.$^5$ .............................................. C08L 75/04
[52] U.S. Cl. ...................................... 528/49; 528/65; 528/66
[58] Field of Search ............................ 528/49, 65, 66

[56] References Cited

U.S. PATENT DOCUMENTS

| | | | |
|---|---|---|---|
| 3,247,236 | 4/1966 | Adams et al. | 260/453 |
| 3,715,381 | 2/1973 | Spaunburgh et al. | 260/453 |

FOREIGN PATENT DOCUMENTS

| | | |
|---|---|---|
| 858921 | 1/1978 | Belgium . |
| 203874 | 12/1986 | European Pat. Off. . |
| 2837770 | 3/1980 | Fed. Rep. of Germany . |
| 45-7044 | 3/1970 | Japan . |
| 45-33438 | 10/1970 | Japan . |
| 48-3825 | 2/1973 | Japan . |
| 50-36546 | 4/1975 | Japan . |
| 50-101344 | 8/1975 | Japan . |
| 63-179917 | 7/1988 | Japan . |
| 1-295201 | 11/1989 | Japan . |
| 1-295202 | 11/1989 | Japan . |
| 1-302202 | 12/1989 | Japan . |
| 2-802 | 1/1990 | Japan . |
| 2-153302 | 6/1990 | Japan . |
| 2-167330 | 6/1990 | Japan . |

*Primary Examiner*—Maurice J. Welsh
*Attorney, Agent, or Firm*—Burns, Doane, Swecker & Mathis

[57] ABSTRACT

Optical urethane resins according to the present invention are each obtained by reacting an active hydrogen compound with an isocyanate compound containing as a stabilizer a phenolic compound. Owing to their low yellowness, high light transmittance and optical-strain-free quality, these resins are useful as optical materials for plastic lenses or the like which are required to be colorless, transparent and uniform.

12 Claims, No Drawings

5,194,559

OPTICAL URETHANE RESINS AND PLASTIC LENSES COMPRISING THE SAME

BACKGROUND OF THE INVENTION a) Field of the Invention

The present invention relates to urethane resins each of which is obtained by reacting an isocyanate compound with an active hydrogen compound.

More specifically, this invention pertains to optical urethane resins which are colored less, have a high total light transmittance and are free of optical strain. The present invention also relates to plastic lenses which comprise the above resins and satisfy the requirement for colorlessness, transparency and uniformity.

b) Description of the Related Art

The present assignee has already filed many applications on plastic lens resins obtained individually by reacting an isocyanate compound with an active hydrogen compound, lenses comprising the same and production processes thereof (Japanese Patent Laid-Open Nos. 295201/ 1989, 302202/1989, 153302/1990, 02/1990, 802/1990, 167330/1990, etc.). Isocyanate compounds useful in the above inventions are, however, accompanied by the drawback that, because of the high reactivity exhibited by each isocyanato group thereof, they lack stability and tend to develop a color and/or, due to self-polymerization, turbidity during storage. Addition of a stabilizer is therefore indispensable to suppress coloration and self-polymerization.

Various compounds have heretofore been known as stabilizers for isocyanate compounds. Representative ones among them are phenolic compounds such as 2,6-di(tertiary-butyl)-p-cresol (U.S. Pat. No. 3,715,381) and phosphite esters such as triphenyl phosphite (Japanese Patent Publication No. 33438/1970).

In addition, many other stabilizers have also been known, including ureas, carbamates, acid amides (Japanese Patent Publication No. 7,044/1970, Japanese Patent Laid-Open No. 36,546/1975), acid substances such as perchloric acid and trifluoromethanesulfonic acid (German Patent No. 2,837,770), carbon dioxide and sulfur dioxide (U.S. Pat. No. 3,247,236), organic amines (Japanese Patent Laid-Open No. 101,344/1975), acid chlorides (Japanese Patent Laid-Open No. 179,917/1988), siloxanes (Belgian Patent No. 858,921), organotin compounds (European Patent Publication No. 203,874), acylisocyanate compounds (Japanese Patent Publication No. 3,825/1973).

Nothing has however been recognized at all regarding possible effects of a stabilizer for an isocyanate compound on the yellowness, total light transmittance and optical isotropy of a urethane resin obtained by reacting the isocyanate compound with an active hydrogen compound.

SUMMARY OF THE INVENTION

The present invention provides a process for producing an optical urethane resin of improved hue, total light transmittance and optical strain by reacting at least one isocyanate compound selected from the group consisting of polyisocyanate compounds and isothiocyanato-containing isocyanate compounds with at least one active hydrogen compound selected from the group consisting of polyol compounds, polythiol compounds and hydroxythiol compounds at an (NCO+NCS)/(OH+SH) functional group molar ratio of from 0.5 to 3.0, which comprises using an isocyanate compound with 10–5,000 ppm of a phenolic compound added therein upon production of the optical urethane resin. The present invention also provides an optical urethane resin obtained by the process as well as a plastic lens comprising the resin.

The coloration and polymerization of an isocyanate compound itself due to changes along the passage of time can be suppressed substantially by the addition of a known stabilizer. It has been found, however, that even if the isocyanate compound itself is colorless and transparent, the yellowness and total light transmittance of the urethane resin obtained by its reaction with an active hydrogen compound vary depending on the kind of the stabilizer.

It has also been found that a stabilizer for an isocyanate compound effects on the optical strain of the resulting urethane resin. Accordingly, the selection of a stabilizer for an isocyanate compound is an extremely important theme especially for the production of an optical material required to have colorless, transparent and uniform qualities such as plastic lenses.

The present inventors have carried out an extensive investigation with a view toward finding a stabilizer for isocyanate compounds, which stabilizer is suitable for the production of colorless and transparent optical urethane resins free of optical strain. As a result, it has been found that a urethane resin obtained by reacting an isocyanate compound, to which a phenolic compound has been added as a stabilizer, with an active hydrogen compound has low yellowness, high total light transmittance and no optical strain, leading to the completion of the invention.

DETAILED DESCRIPTION OF THE INVENTION

The term "a phenolic compound" as used herein means a compound having one or more phenolic hydroxyl groups. Examples of the phenolic compound include phenol; substituted phenolic compounds such as cresol, ethylphenol, isopropylphenol, (tertiary-butyl)-phenol, hexylphenol, cyclohexylphenol, 2,6-di-(tertiary-butyl)-p-cresol, guaiacol and eugenol; polyhydric phenols such as catechol, resorcin, hydroquinone, (tertiarybuthyl)catechol and pyrogallol; biphenols such as biphenol and dimethyl biphenol; bisphenols such as bisphenol A, bisphenol F, bisphenol S, methylene-bis(-methyl-tertiary-butylphenol) and thio-bis(methyltertiary-butylphenol); and naphtols such as naphtol and dihydroxynaphthalene. In addition, F-, Cl- or Br-substituted derivatives thereof can also be used effectively. Among them, phenol is preferred. The use of phenol makes it possible to yield urethane resins excellent in yellowness and total light transmittance and free of optical strain.

It is desirable to add 10–5,000 ppm of a phenolic compound to an isocyanate compound. Amounts smaller than 10 ppm cannot improve the stability of the isocyanate compound itself and result in urethane resins with a low total light transmittance. Amounts greater than 5,000 ppm, on the other hand, tend to conversely aggravate the coloration of the isocyanate compound. Amounts outside the above range are therefore not preferred.

Isocyanate compounds usable in the present invention can be selected from the group consisting of polyisocyanate compounds and isothiocyanato-containing isocyanate compounds.

Examples of the polyisocyanate compound include aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, 2,5,7-trimethyl-1,8-diisocyanato-5-isocyanato methyloctane, bis-(isocyanatoethyl)carbonate, bis(isocyanatoethyl)ether, 1,4-butyleneglycol dipropylether-α,α'-diisocyanate, methyl lysinediisocyanate, lysine triisocyanate, 2-isocyanatoethyl 2,6-diisocyanatohexanoate, 2-isocyanatopropyl 2,6-diisocyanatohexanoate, xylylene diisocyanate, bis(isocyanatoethyl)benzene, bis-(isocyanatopropyl)benzene, a,α,α',α'-tetramethylxylylene diisocyanate, bis(isocyanatobutyl)benzene, bis-(isocyanatomethyl)naphthalene, bis(isocyanatomethyl)-diphenylether, bis(isocyanatoethyl)phthalate, mesitylene triisocyanate, 2,6-di(isocyanatomethyl)furan, isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimer acid diisocyanate, 2-isocyanatomethyl-3-(3-isocyanatopropyl)-5-isocyanatomethyl-bicyclo[2.2.1]heptane, 2-isocyanatomethyl-3-(3-isocyantopropyl)-6-isocyanatomethyl-bicyclo[2.2.1]heptane, 2-isocyanatomethyl-2-(3-isocyantopropyl)-5-isocyanatomethyl-bicyclo[2.2.1-]heptane, 2-isocyantomethyl-2-(3-isocyanatopropyl)-6-isocyanatomethyl-bicyclo[2.2.1]heptane, 2-isocyanatomethyl-3-(3-isocyanatopropyl)-5-(2-isocyanatoethyl)-bicyclo[2.2.1]heptane, 2-isocyanatomethyl-3-(3-isocyanatopropyl)-6-(2-isocyanatoethyl)-bicyclo-[ 2.2.1]heptane, 2-isocyanatomethyl-2-(3-isocyantopropyl)-5-(2-isocyanatoethyl)-bicyclo[2.2.1]heptane, 2-isocyanatomethyl-2-(3-isocyanatopropyl)-6-(2-isocyanatoethyl)-bicyclo[2.2.1]heptane and 2,5(or 6)bis-(isocyanatomethyl)-bicyclo[2.2.1]heptane; and aromatic polyisocyanates such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, diphenylmethane diisocyanate, naphthalene triisocyanate, diphenylmethane-2,4,4'-triisocyanate, 3-methyldiphenylmethane-4,6,4'-triisocyanate, 4-methyl-diphenylmethane-3,5,2',4'6'-pentaisocyanate, phenylisocyanatomethyl isocyanate, phenylisocyanatoethyl isocyanate, tetrahydronaphthalene diisocyanate, hexahydrobenzene diisocyanate, hexahydrodiphenylmethane-4,4'-diisocyanate, diphenylether diisocyanate, ethyleneglycol diphenylether diisocyanate, 1,3-propyleneglycol diphenylether diisocyanate, benzophenone diisocyanate, diethyleneglycol diphenylether diisocyanate, dibenzofuran diisocyanate, carbazole diisocyanate, ethylcarbazole diisocyanate and dichlorocarbazole diisocyanate.

Illustrative sulfur-containing polyisocyanate compounds include sulfur-containing aliphatic isocyanates such as thiodiethylene diisocyanate, thiodipropyl diisocyanate, thiodihexyl diisocyanate, dimethylsulfone diisocyanate, dithiodimethyl diisocyanate, dithiodiethyl diisocyanate and dithiodipropyl diisocyanate; aromatic sulfide-bond-containing isocyanates such as diphenylsulfido-2,4'-diisocyanate, diphenylsulfide-4,4'-diisocyanate, 3,3'-dimethoxy-4,4'-diisocyanatodibenzylthioether, bis(4-isocyanatomethylphenyl)sulfide and 4,4'-methoxyphenylthioethyleneglycol-3,3'-diisocyanate; disulfide-bond-containing aromatic isocyanates such as diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate; sulfone-bond-containing aromatic isocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylsulfone-2,4'-diisocyanate, 4,4'-dimethoxydiphenylsulfone-3,3'-diisocyanate, 3,3'-dimethoxy-4,4'-diisocyanatobenzylsulfone, 4,4'-dimethyldiphenylsulfone-3,3'-diisocyanate, 4,4'-di-tert-butyldiphenylsulfone-3,3'-diisocyanate, 4,4'-methoxyphenylethylenesulfone-3,3'-diisocyanate and 4,4'-dicyclodiphenylsulfone-3,3'-diisocyante; sulfonate-ester-bond-containing aromatic isocyanates such as 4-methyl-3-isocyanatophenylsulfonyl-4'-isocyanatophenol ester and 4-methoxy-3-isocyanatophenylsulfonyl-4'-isocyanatophenol ester; sulfonamide-bond-containing aromatic isocyanates such as 4-methyl-3-isocyanatophenylsulfonylanilido-3'-methyl-4'-isocyanate, diphenylsulfonyl-ethylenediamine-4,4'-diisocyanate, 4,4'-methoxyphenylsulfonyl-ethylenediamine-3,3'-diisocyanate and 4-methyl-3-isocyanatophenylsulfonylanilido-4-methyl-3'-isocyanate; sulfur-containing heterocyclic compounds such as thiophene-2,5-diisocyanate; and, further, 1,4-dithiane-2,5-diisocyanate.

Examples of the isothiocyanato-containing isocyanate compounds include aliphatic compounds such as 1-isocyanato-3-isothiocyanatopropane, 1-isocyanato-5-isothiocyanatopentane, 1-isocyanato-6-isothiocyanatohexane, isothiocyanatocarbonylisocyanate and 1-isocyanato-4-isothiocyanatocyclohexane; aromatic compounds such as 1-isocyanato-4-isothiocyanatobenzene and 4-methyl-3-isocyanato-1-isothiocyanatobenzene; heterocyclic compounds such as 2-isocyanato-4,6-diisothiocyanato-1,3,5-triazine; and compounds containing one or more sulfur atoms other than that contained in each isothiocyanato group, such as 4-isocyanato-4'-isothiocyanatodiphenylsulfide and 2-isocyanato-2'-isothiocyanatodiethyldisulfide.

Further, halogen-substituted derivatives, such as the chlorine- or bromine-substituted derivatives, of the above-exemplified isocyanate compounds as well as their biuret reaction products, adduct reaction products with trimethylolpropane, dimer reaction products and trimer reaction products can also be used. They may be used either singly or in combination.

The active hydrogen compound usable in the practice of the present invention can be selected from polyol compounds, polythiol compounds and hydroxythiol compounds. Examples of the polyol compounds include aliphatic polyols such as ethylene glycol, diethylene glycol, propylene glycol, dipropylene glycol, butylene glycol, neopenthyl glycol, glycerin, trimethylol ethane, trimethylol propane, butane triol, 1,2-methylglycoside, pentaerythritol, dipentaerythritol, tripentaerythritol, sorbitol, erythritol, threitol, ribitol, arabinitol, xylitol, allitol, mannitol, dulcitol, iditol, glycol, inositol, hexane triol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexane dimethanol, hydroxypropyl cyclohexanol, tricyclo[5.2.1.0$^{2,6}$]decane-dimethanol, bicyclo[4.3.0]nonanediol, dicyclohexanediol, tricyclo[5.3.1.1]dodecanediol, bicyclo[4.3.0]nonane dimethanol, tricyclo[5.3.1.1]dodecane diethanol, hydroxypropyltricyclo[5.3.1.1]dodecanol, spiro[3.4]octanediol, butylcyclohexanediol, 1,1'-bicyclohexylidenediol, cyclohexane triol, maltitol and lactose; aromatic polyols such as dihydroxynaphthalene, trihydroxynaphthalene, tetrahydroxynaphthalene, dihydroxybenzene, benzene triol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis(2-hydroxyethylether), tetrabrom bisphenol A and tetrabromobisphenol A-bis(2-hydroxyethylether); halogenated polyols such as dibromoneopentyl glycol; high-molecular polyols such as epoxy resin. Also included as examples are condensation reaction products between the above-exemplified polyols and organic acids such as oxalic acid, glutamic acid, adipic acid, acetic acid, propionic acid, cyclohexanecarboxylic acid, β-oxocyclohexanepropionic acid, dimer acids, phthalic acid, isophthalic acid, salicylic acid, 3-bromopropionic acid, 2-bromoglycol, dicarboxycyclohexane, pyromellitic acid, butanetetracarboxylic acid and bromophthalic acid; and addition reaction products between the above-exemplified polyols and alkylene oxides such as ethylene oxide and propylene oxide. Still further examples include bis-[4-(hydroxyethoxy)phenyl]sulfide, bis[4-(2-hydroxypropoxy)phenyl]sulfide, bis[4-(2,3-dihydroxypropoxy)phenyl]sulfide, bis[4-(4-(hydroxycyclohexyloxy)phenyl]sulfide and bis[2-methyl-4-(hydroxyethoxy)-6-butylphenyl]sulfide, and compounds obtained by adding thereto three or fewer molecules on average of ethylene oxide and/or propylene oxide per hydroxyl group; and sulfur-containing polyols such as di-(2-hydroxyethyl)sulfide, 1,2-bis-(2-hydroxyethylmercapto)ethane, bis(2-hydroxyethyl)disulfide, 1,4-dithiane-2,5-diol, bis(2,3-hydroxypropyl)sulfide, tetrakis(4-hydroxy-2-thiabutyl)methane, bis(4-hydroxyphenyl)sulfone (trade name: bisphenol S), tetrabromobisphenol S, tetramethylbisphenol S, 4,4'-thiobis(6-tert-butyl-3-methylphenol) and 1,3-bis(2-hydroxyethylthioethyl)cyclohexane.

Illustrative of the polythiol compounds include aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2.2.1]hepta-exo-cis-2,3-dithiol, 1,1-bis(mercaptomethyl)cyclohexane, bis(2-mercaptoethyl) thiomalate, (2-mercaptoethyl) 2,3-dimercaptosuccinate, 2,3-dimercapto-1-propanol (2-mercaptoacetate), 2,3-dimercapto-1-propanol (3-mercaptoacetate), diethyleneglycol bis(2-mercaptoacetate), diethyleneglycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethyleneglycol bis(2-mercaptoacetate), ethyleneglycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate) and 1,2-bis(2-mercaptoethylthio)-3-mercaptopropane; aromatic polythiols such as 1,2-dimercaptobenzene, 1,3-dimercaptobenzene, 1,4-dimercaptobenzene, 1,2-bis(mercaptomethyl)benzene, 1,3bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mecaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane; halogen-substituted aromatic polythiols such as chlorine- or bromine-substituted aromatic polythiols, e.g., 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene; heterocycle-containing polythiols such as 2-methylamino-4,6-dithiol-symtriazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine and 2-thiobutyloxy-4,6-dithiolsym-triazine; aromatic polythiols, which contain one or more sulfur atoms other than that contained in each mercapto group, such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene and nucleus-alkylated derivatives thereof; aliphatic polythiols, which contain one or more sulfur atoms other than that contained in each mercapto group, such as bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide, bis(mercaptopropyl)disulfide, thioglycolic acid or mercaptopropionic acid ester thereof, hydroxymethylsulfide bis(2-mercaptoacetate), hydroxymethylsulfide bis(3-mercaptopropionate), hydroxyethylsulfide bis(2-mercaptoacetate), hydroxyethylsufide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopriopionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopriopionate), 2-mercaptoethylether bis(2-mercaptoacetate), 2-mercaptoethylether bis(3-mercaptopriopionate), 1,4-dithiane-2,5-diol bis(2-mercaptoacetate), 1,4-dithiane-2,5-diol bis(3-mercaptopropionate), bis(2-mercaptoethyl) thioglycolate, bis(2-mercaptoethyl) thiodipropionate, bis(2-mercaptoethyl) 4,4-thiodibutylate, bis(2-mercaptoethyl) dithiodiglycolate, bis(2-mercaptoethyl) dithiodipropionate, bis(2-mercaptoethyl) 4,4-dithiodibutylate, bis(2,3-dimercaptopropyl) thiodiglycolate, bis(2,3-dimercaptopropyl) thiodipropionate, bis(2,3-dimercaptopropyl) dithioglycolate and (2,3-dimercaptopropyl) dithiodipropionate; and heterocyclic compounds, which contain one or more sulfur atoms except that in each mercapto group, such as 3,4-thiophenedithiol and 2,5-dimercapto-1,3,4-thiadiazole.

Exemplary hydroxythiol compounds include 2mercaptoethanol, 3-mercapto-1,2-propanediol, glycerol di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris(-3mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane mono(salicylate) and hydroxyethylthiomethyltris(mercaptoethylthio)methane.

Further, halogen-substituted (e.g. Cl- and Br-substituted) derivatives of these active hydrogen compounds may also be used. They may be used either singly or in combination.

These isocyanate compounds and active hydrogen compounds can be used at an (NCO+NCS)/(OH+SH) functional group molar ratio generally in a range of from 0.5 to 3.0, preferably in a range of from 0.5 to 1.5.

Various known additives such as chain extenders, crosslinking agents, light stabilizers, ultraviolet light absorbers, antioxidants, oil-soluble dyes, fillers and internal release agents may be added according to the application purpose of the urethane resin.

Known reaction catalysts employed in the preparation of polyurethane resins can also be added, as needed, to control the reaction velocity.

Specifically describing the process of the present invention for the production of a plastic lens, it is preferred to mix one or more isocyanate compounds and one or more active hydrogen compounds and, optionally, one or more additives, a catalyst and the like to inject the mixture in a mold and then to polymerize it there. Here, degasification is usually effected prior to the injection in order to prevent trapping of bubbles in the resultant resin.

The polymerization temperature and time vary depending on the kinds of the monomers and additives. In general, the temperature may range from −50° C. to 200° C., preferably from room temperature to 150° C., more preferably from 50° C. to 120° C. On the other hand, the time may range from 0.5 to 72 hours. The lens so polymerized may be annealed as needed.

The present invention will hereinafter be described specifically by the following examples and comparative examples. It should however be borne in mind that this invention is by no means limited to or by the examples.

EXAMPLES 1-11

In each example, the active hydrogen compound and the isocyanate compound added with the phenolic stabilizer, all shown in Table 1, were mixed, followed by degasification under reduced pressure. The resulting mixture was injected into a mold formed of a glass mold and a gasket and having a thickness of 9 mm and a diameter of 70 mm. The mixture was gradually heated from room temperature to 120° C., at which it was allowed to harden for 48 hours. After the polymerization, the resulting resin was taken out of the mold. The yellowness and total transmittance of the 9 mm-thick plane resin thus obtained were measured in accordance with the methods set out under JIS-K-7105-6.3 and JIS-K-7105-5.5, respectively.

In addition, the presence or absence of any optical strain was judged by the crossed Nicols method, using a "Toshiba Strain Detector" (trade name: SVP-100). The result is shown in Table 1.

COMPARATIVE EXAMPLES 1-21

In each comparative example, the isocyanate compound added with the known non-phenolic stabilizer, both shown in Table 2, was used. The yellowness and total light transmittance of the resulting plane resin and the presence or absence of any optical strain therein were determined similarly to the above examples. The results are shown in Table 2.

As will be apparent from a comparison between Examples 3-5 and Comparative Examples 1-17 and also that between Examples 6,2,7 and 8 and Comparative Examples 18-21, use of the phenolic compounds as stabilizers for the isocyanate compounds made it possible to provide the urethane resins through the reaction between the isocyanate compounds and their corresponding active hydrogen compounds, said urethane resins being excellent in yellowness and total light transmittance and also being free of any appreciable optical strain.

Namely, it is clear that the urethane resin of the present invention, which is obtained by reacting an active hydrogen compound with an isocyanate compound containing 10-5,000 ppm of a phenolic derivative as a stabilizer, is useful as an optical material for plastic lenses or the like for its superiority in colorless transparency to conventional urethane resins, each of which is obtained by reacting an active hydrogen compound with an isocyanate compound containing a nonphenolic stabilizer and also for its optical-strain-free quality.

TABLE 1

| Ex. | Isocyanate compound | Stabilizer for isocyanate compound | Active hydrogen compound | Yellowness (YI) | Total light transmittance (%) | Optical strain |
|---|---|---|---|---|---|---|
| 1 | (CH₂CH₂CH₂NCO)₂<br>0.30 mol | 2-methoxyphenol (guaiacol)<br>10 ppm | 1,3-benzenedithiol<br>0.20 mol | 1.3 | 90 | Not observed |
| 2 | 1,3,5-tris(isocyanatomethyl)-2,4,6-trimethylbenzene derivative<br>0.30 mol | 3-methylphenol (m-cresol)<br>5000 ppm | 4,4'-thiobis(phenol/thiophenol) compound<br>0.30 mol | 1.2 | 90 | Not observed |
| 3 | 1,3-bis(isocyanatomethyl)benzene<br>0.30 mol | phenol<br>10 ppm | C(CH₂OCCH₂CH₂SH)₄<br>     ‖<br>     O<br>0.15 mol | 1.2 | 90 | Not observed |
| 4 | 1,3-bis(isocyanatomethyl)benzene<br>0.30 mol | phenol<br>500 ppm | C(CH₂OCCH₂CH₂SH)₄<br>     ‖<br>     O<br>0.15 mol | 1.2 | 90 | Not observed |
| 5 | 1,3-bis(isocyanatomethyl)benzene<br>0.30 mol | phenol<br>5000 ppm | C(CH₂OCCH₂CH₂SH)₄<br>     ‖<br>     O<br>0.15 mol | 1.2 | 90 | Not observed |

TABLE 1-continued

| Ex. | Isocyanate compound | Stabilizer for isocyanate compound | Active hydrogen compound | Yellowness (Y1) | Total light transmittance (%) | Optical strain |
|---|---|---|---|---|---|---|
| 6 | 2,4-tolylene diisocyanate (CH₃-C₆H₃(NCO)₂) 0.30 mol | 2,6-di-tert-butyl-4-methylphenol 100 ppm | C(CH₂SCH₂CH₂SH)₄ 0.15 mol | 1.4 | 89 | Not observed |
| 7 | OCN(CH₂)₃NCS 0.30 mol | catechol 100 ppm | 4-hydroxythiophenol 0.30 mol | 1.3 | 89 | Not observed |
| 8 | S(CH₂CH₂NCO)₂ 0.30 mol | pyrogallol 10 ppm | tetrabromobisphenol A 0.30 mol | 1.2 | 89 | Not observed |
| 9 | 4,4'-thiobis(phenyl isocyanate) 0.30 mol | 4,4'-biphenol 500 ppm | C(CH₂SCH₂CH₂OH)₄ 0.05 mol | 1.4 | 90 | Not observed |
| 10 | 4,4'-thiobis(phenyl isothiocyanate) 0.30 mol | bisphenol A 500 ppm | HO(CH₂)₄OH 0.30 mol | 1.4 | 90 | Not observed |

TABLE 1-continued
| Ex. | Isocyanate compound | Stabilizer for isocyanate compound | Active hydrogen compound | Yellowness (Y1) | Total light transmittance (%) | Optical strain |
|---|---|---|---|---|---|---|
| 11 | 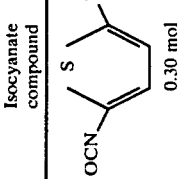 0.30 mol |  1000 ppm | HOCH₂CHCH₂SH<br>  \|<br>  OH<br>0.40 mol | 1.4 | 89 | Not observed |
| 12 |  0.30 mol | 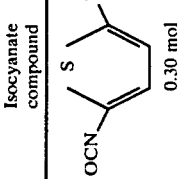 200 ppm |  0.30 mol | 1.4 | 89 | Not observed |
| 13 | S$\pmb{+}$CH₂CH₂NCO)₂<br>0.20 mol<br>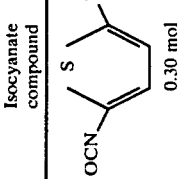 0.10 mol | 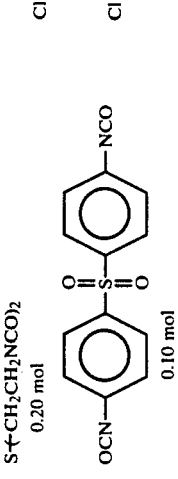 100 ppm | C$\pmb{+}$CH₂SCH₂CH₂OH)₄<br>0.05 mol<br> 0.20 mol | 1.3 | 90 | Not observed |

TABLE 2

| Comp. Ex. | Isocyanate compound | Stabilizer for isocyanate compound | Active hydrogen compound | Yellowness (YI) | Total light transmittance (%) | Optical strain |
|---|---|---|---|---|---|---|
| 1 | CH₂NCO–C₆H₄–CH₂NCO<br>0.30 mol | P(–O–C₆H₅)₃<br>500 ppm | C(–CH₂OCCH₂CH₂SH)₄<br>‖<br>O<br>0.15 mol | 1.4 | 90 | Observed |
| 2 | ↑ | H₂NCNHCCH₃<br>‖ ‖<br>O O<br>500 ppm | ↑ | 1.5 | 89 | Observed |
| 3 | ↑ | H₂NCNH₂<br>‖<br>S<br>500 ppm | ↑ | 1.6 | 89 | Observed |
| 4 | ↑ | (succinimide structure with NH)<br>500 ppm | ↑ | 1.5 | 88 | Observed |
| 5 | ↑ | HCNH₂<br>‖<br>O<br>500 ppm | ↑ | 1.6 | 90 | Observed |
| 6 | ↑ | (N,N'-dibutyl barbiturate-type ring with Bu groups)<br>500 ppm | ↑ | 1.5 | 89 | Observed |
| 7 | ↑ | Me–C₆H₄–SO₂NH₂<br>500 ppm | ↑ | 1.5 | 90 | Observed |

TABLE 2-continued

| Comp. Ex. | Isocyanate compound | Stabilizer for isocyanate compound | Active hydrogen compound | Yellowness (YI) | Total light transmittance (%) | Optical strain |
|---|---|---|---|---|---|---|
| 8 | ↑ | CO$_2$ 500 ppm | ↑ | 1.4 | 89 | Observed |
| 9 | ↑ | H$_2$S 500 ppm | ↑ | 1.6 | 88 | Observed |
| 10 | ↑ | Cl$_3$CCNCO 500 ppm | ↑ | 1.7 | 89 | Observed |
| 11 | ↑ | ⬡-COCl 500 ppm | ↑ | 1.7 | 89 | Observed |
| 12 | ↑ | H$_3$C(CH$_2$)$_{11}$—SH 500 ppm | ↑ | 1.4 | 88 | Observed |
| 13 | ↑ | F$_3$CSO$_3$H 500 ppm | ↑ | 3.0 | 88 | Observed |
| 14 | ↑ | NEt$_3$ 500 ppm | ↑ | 2.5 | 86 | Observed |
| 15 | ↑ 0.30 mol | (Bu$_3$Sn)$_2$O 500 ppm | ↑ | 1.5 | 87 | Observed |
| 16 | ↑ | HCl 500 ppm | ↑ | 2.4 | 88 | Observed |
| 17 | ↑ | Not added | ↑ | 1.4 | 88 | Observed |
| 18 | 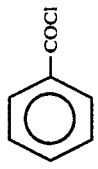 CH$_3$-⬡(NCO)(NCO) 0.30 mol | P(-O-⬡)$_3$ 500 ppm | C(-CH$_2$SCH$_2$CH$_2$SH)$_4$ 0.15 mol | 1.4 | 89 | Observed |

TABLE 2-continued
| Comp. Ex. | Isocyanate compound | Stabilizer for isocyanate compound | Active hydrogen compound | Yellowness (YI) | Total light transmittance (%) | Optical strain |
|---|---|---|---|---|---|---|
| 19 | 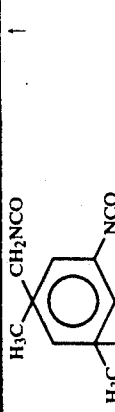 0.30 mol | ↑ | 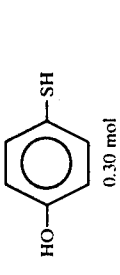 0.30 mol | 1.3 | 89 | Observed |
| 20 | OCN(CH$_2$)$_3$NCS 0.30 mol | ↑ | 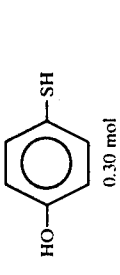 0.30 mol | 1.4 | 89 | Observed |
| 21 | S(CH$_2$CH$_2$NCO)$_2$ 0.30 mol | ↑ | 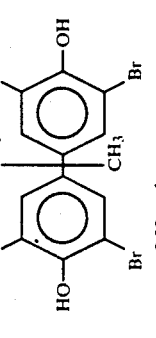 0.30 mol | 1.3 | 89 | Observed |

What we claim is:

1. A process for producing an optical urethane resin of improved hue, total light transmittance and optical strain by reacting at least one isocyanate compound selected from the group consisting of polyisocyanate compounds and isothiocyanato-containing isocyanate compound with at least one active hydrogen compound selected from the group consisting of polyol compounds, polythiol compounds and hydroxythiol compounds at an (NCO+NCS)/(OH+SH) functional group molar ratio of from 0.5 to 3.0, which comprises using an isocyanate compound with 10-5,000 ppm of a phenolic compound added therein upon production of the optical urethane resin.

2. The process of claim 1, wherein the phenolic compound is phenol.

3. The process of claim 1, wherein the isocyanate compound is an aliphatic polyisocyanate.

4. The process of claim 1, wherein the isooyanate compound is xylylene diisooyanate.

5. An optical urethane resin obtained by reacting at least one isocyanate compound selected from the group consisting of polyisocyanate compound and isothiocyanato-containing isocyanate compounds with at least one active hydrogen compound selected from the group consisting of polyol compounds, polythiol compounds and hydroxythiol compounds at an (NCO+NCS)/(OH+SH) functional group molar ratio of from 0.5 to 3.0, said isocyanate compound having been added with 10-5,000 ppm of a phenolic compound.

6. The resin of claim 5, wherein the phenolic compound is phenol.

7. The resin of claim 5, wherein the isocyanate compound is an aliphatic polyisocyanate.

8. The resin of claim 5, wherein the isocyanate compound is xylylene diisocyanate.

9. A plastic lens comprising an optical urethane resin obtained by reacting at least one isocyanate compound selected from the group consisting of polyisocyanate compound and isothiocyanato-containing isocyanate compounds with at least one active hydrogen compound selected from the group consisting of polyol compounds, polythiol compounds and hydroxythiol compounds at an (NCO+NCS)/(OH+SH) functional group molar ratio of from 0.5 to 3.0, said isocyanate compound having been added with 10-5,000 ppm of a phenolic compound.

10. The lens of claim 9, wherein the phenolic compound is phenol.

11. The resin of claim 9, wherein the isocyanate compound is an aliphatic polyisocyanate.

12. The resin of claim 9, wherein the isocyanate compound is xylylene diisocyanate.

* * * * *